(12) United States Patent
Pankratov et al.

(10) Patent No.: US 11,555,410 B2
(45) Date of Patent: Jan. 17, 2023

(54) LABYRINTH SEAL WITH VARIABLE SEAL CLEARANCE

(71) Applicant: PRATT & WHITNEY CANADA CORP., Longueuil (CA)

(72) Inventors: Maksim Pankratov, Saint Amable (CA); Michel Massicotte, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 53 days.

(21) Appl. No.: 16/792,465

(22) Filed: Feb. 17, 2020

(65) Prior Publication Data

US 2021/0254487 A1 Aug. 19, 2021

(51) Int. Cl.
*F01D 25/24* (2006.01)
*F01D 11/02* (2006.01)
*F01D 25/16* (2006.01)

(52) U.S. Cl.
CPC ............ *F01D 11/02* (2013.01); *F01D 25/162* (2013.01); *F01D 25/24* (2013.01); *F05D 2220/32* (2013.01); *F05D 2240/55* (2013.01); *F05D 2240/60* (2013.01)

(58) Field of Classification Search
CPC ........ F01D 11/02; F01D 25/162; F01D 25/24; F05D 2220/32; F05D 2240/55; F05D 2240/60
See application file for complete search history.

(56) References Cited

U.S. PATENT DOCUMENTS

| | | | | |
|---|---|---|---|---|
| 1,708,044 A | * | 4/1929 | Baumann | F01D 11/025 277/418 |
| 3,940,153 A | * | 2/1976 | Stocker | F16J 15/4472 277/418 |
| 4,257,735 A | * | 3/1981 | Bradley | F01D 11/02 277/303 |
| 4,320,903 A | * | 3/1982 | Ayache | F02C 7/28 277/418 |
| 4,513,975 A | * | 4/1985 | Hauser | F01D 11/02 277/415 |
| 5,211,535 A | * | 5/1993 | Martin | F01D 11/02 277/413 |
| 5,639,095 A | * | 6/1997 | Rhode | F16J 15/4472 277/303 |
| 6,045,134 A | * | 4/2000 | Turnquist | F16J 15/3288 277/347 |
| 8,016,553 B1 | | 9/2011 | Liang | |

(Continued)

*Primary Examiner* — David E Sosnowski
*Assistant Examiner* — Theodore C Ribadeneyra
(74) *Attorney, Agent, or Firm* — Norton Rose Fulbright Canada LLP

(57) ABSTRACT

A labyrinth seal, has: rotating and static components rotatable relative to one another relative to a central axis, the rotating component securable to a shaft via a tight fit engagement at an engagement location on the rotating component, the static component securable to a housing; teeth protruding from one of the rotating and static components towards a seal land defined by the other one of the rotating and static components; and clearances between the teeth and the seal land, a first clearance of the clearances greater than a second clearance of the clearances, the first clearance located closer to the engagement location of the rotating component than the second clearance.

19 Claims, 3 Drawing Sheets

(56) References Cited

U.S. PATENT DOCUMENTS

| | | | |
|---|---|---|---|
| 8,360,712 B2 | 1/2013 | Deo et al. | |
| 9,181,817 B2 | 11/2015 | Deo et al. | |
| 10,006,292 B2* | 6/2018 | Kuwamura | F01D 11/02 |
| 10,598,038 B2* | 3/2020 | MirzaMoghadam | F01D 11/122 |
| 2002/0190474 A1* | 12/2002 | Turnquist | F16J 15/442 277/355 |
| 2007/0257445 A1* | 11/2007 | Mortzheim | F16J 15/442 277/413 |
| 2008/0265513 A1* | 10/2008 | Justak | F01D 11/025 277/301 |
| 2011/0014035 A1* | 1/2011 | Kojima | C23C 4/073 415/174.2 |
| 2011/0182719 A1* | 7/2011 | Deo | F16J 15/4472 415/173.1 |
| 2012/0003080 A1* | 1/2012 | Deo | F01D 11/001 415/174.5 |
| 2012/0193875 A1* | 8/2012 | Deo | F01D 11/02 277/412 |
| 2013/0058766 A1* | 3/2013 | Zheng | F01D 11/003 415/173.5 |
| 2014/0300058 A1* | 10/2014 | Brunet | F01D 11/02 277/351 |
| 2015/0097342 A1* | 4/2015 | Morreale | F16J 15/453 277/417 |
| 2016/0047475 A1* | 2/2016 | Aksit | F01D 11/00 277/355 |
| 2016/0130965 A1* | 5/2016 | Yamaguchi | F01D 11/08 415/13 |
| 2016/0130966 A1* | 5/2016 | Shorney | F16J 15/4472 277/412 |
| 2017/0067397 A1* | 3/2017 | Fang | F16C 33/664 |
| 2017/0130601 A1* | 5/2017 | Coutandin | F01D 9/02 |
| 2017/0198597 A1* | 7/2017 | Chun | F16J 15/447 |
| 2018/0087669 A1* | 3/2018 | Saha | F01D 11/08 |
| 2018/0163557 A1* | 6/2018 | Kuwamura | F16J 15/445 |
| 2019/0003326 A1* | 1/2019 | Simeone | F01D 5/081 |
| 2019/0055851 A1* | 2/2019 | Lee | F01D 11/001 |
| 2019/0153884 A1 | 5/2019 | MirzaMoghadam et al. | |

\* cited by examiner

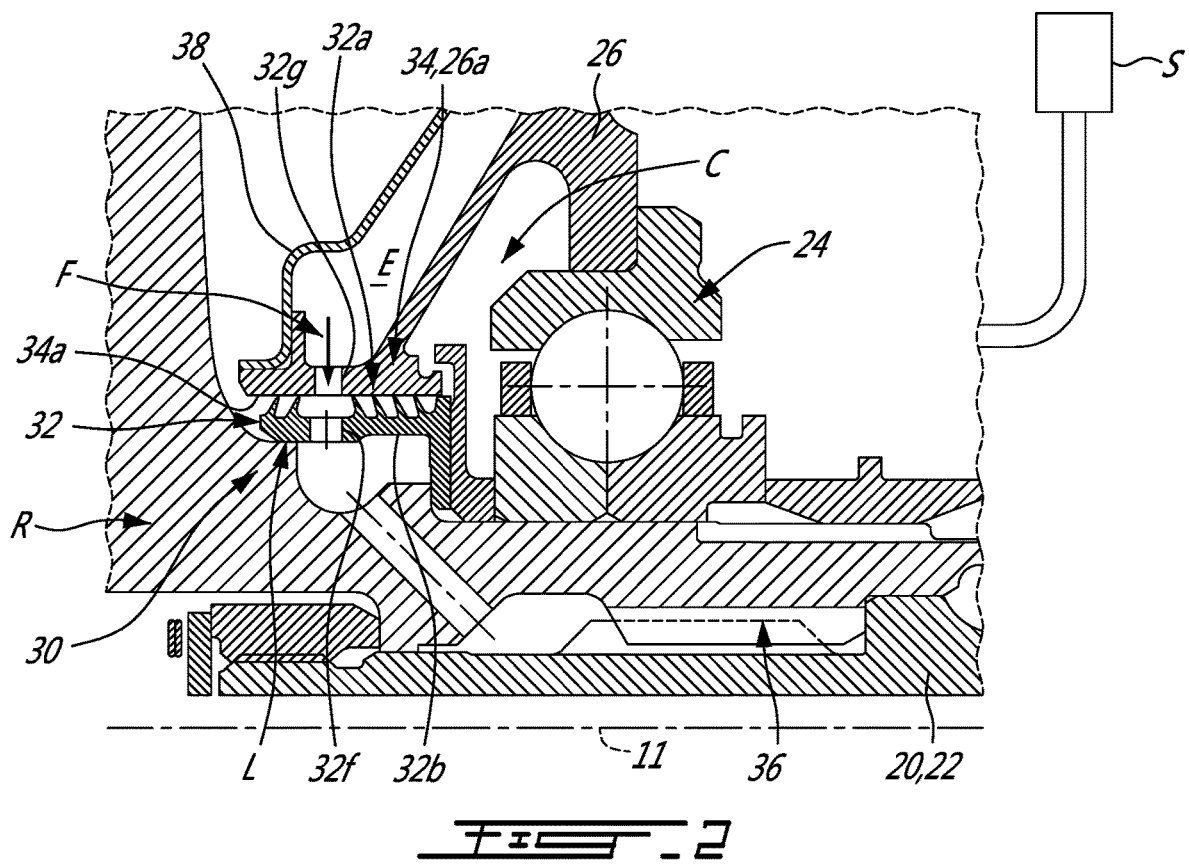
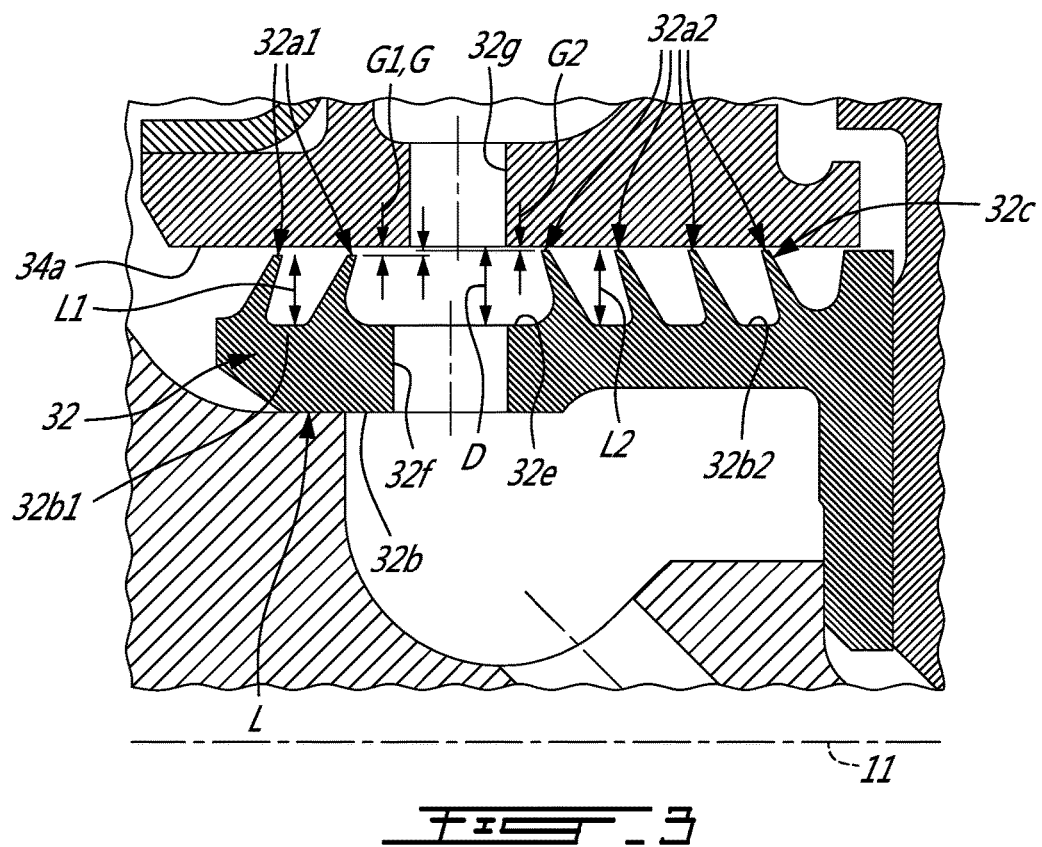

LABYRINTH SEAL WITH VARIABLE SEAL CLEARANCE

TECHNICAL FIELD

The application relates generally to gas turbine engine and, more particularly, to seals used in such engines.

BACKGROUND OF THE ART

Labyrinth seals are used in a gas turbine engine to create a sealing engagement between a rotating component and a stationary component. Labyrinth seals defines a plurality of teeth, also referred to as knife edges, that extend from one of the rotating and stationary components towards the other one of the rotating and stationary components. A clearance remains between tips of the teeth and the other of the rotating and stationary components. In operation, the clearance may vary and care should be taken to avoid rubbing between the rotating and static components.

SUMMARY

In one aspect, there is provided a labyrinth seal, comprising: rotating and static components rotatable relative to one another relative to a central axis, the rotating component securable to a shaft via a tight fit engagement at an engagement location on the rotating component, the static component securable to a housing; teeth protruding from one of the rotating and static components towards a seal land defined by the other one of the rotating and static components; and clearances between the teeth and the seal land, a first clearance of the clearances greater than a second clearance of the clearances, the first clearance located closer to the engagement location of the rotating component than the second clearance.

In another aspect, there is provided a gas turbine engine, comprising: a shaft rotatable about a central axis; a housing; and at least one bearing located radially between the shaft and the housing, the at least one bearing contained within a bearing cavity; and a labyrinth seal for sealing the bearing cavity from an environment outside of the bearing cavity, the labyrinth seal including a seal runner secured to the shaft via a tight fit engagement between the shaft and an engagement location of the seal runner, and a seal stator defined by the housing, teeth extending from one of the seal runner and the seal stator toward a seal land defined by the other of the seal runner and the seal stator, the teeth spaced apart from the seal land by clearances, a first clearance of the clearances being greater than a second clearance of the clearances, the first clearance closer to the bearing cavity than the second clearance.

In yet another aspect, there is provided a seal component for a labyrinth seal, the seal component configured to be secured to a shaft or a housing of a gas turbine engine and having a central axis, the seal component comprising a first face and an opposed second face, teeth protruding from the second face and away from the first face, a portion of the first face having a diameter different than that of the shaft or the housing such that the seal component is securable to the shaft or the housing via a tight fit engagement at the portion, a distance between a tip of one of the teeth and the central axis different than a distance between a tip of another one of the teeth and the central axis, the one of the teeth closer to the portion of the first face than the other one of the teeth.

DESCRIPTION OF THE DRAWINGS

Reference is now made to the accompanying figures in which:

FIG. 2 is a schematic cross-sectional view of a portion of the gas turbine engine of FIG. 1 including a labyrinth seal;

FIG. 3 is a schematic enlarged view of the labyrinth seal of FIG. 2;

DETAILED DESCRIPTION

Figure 1:
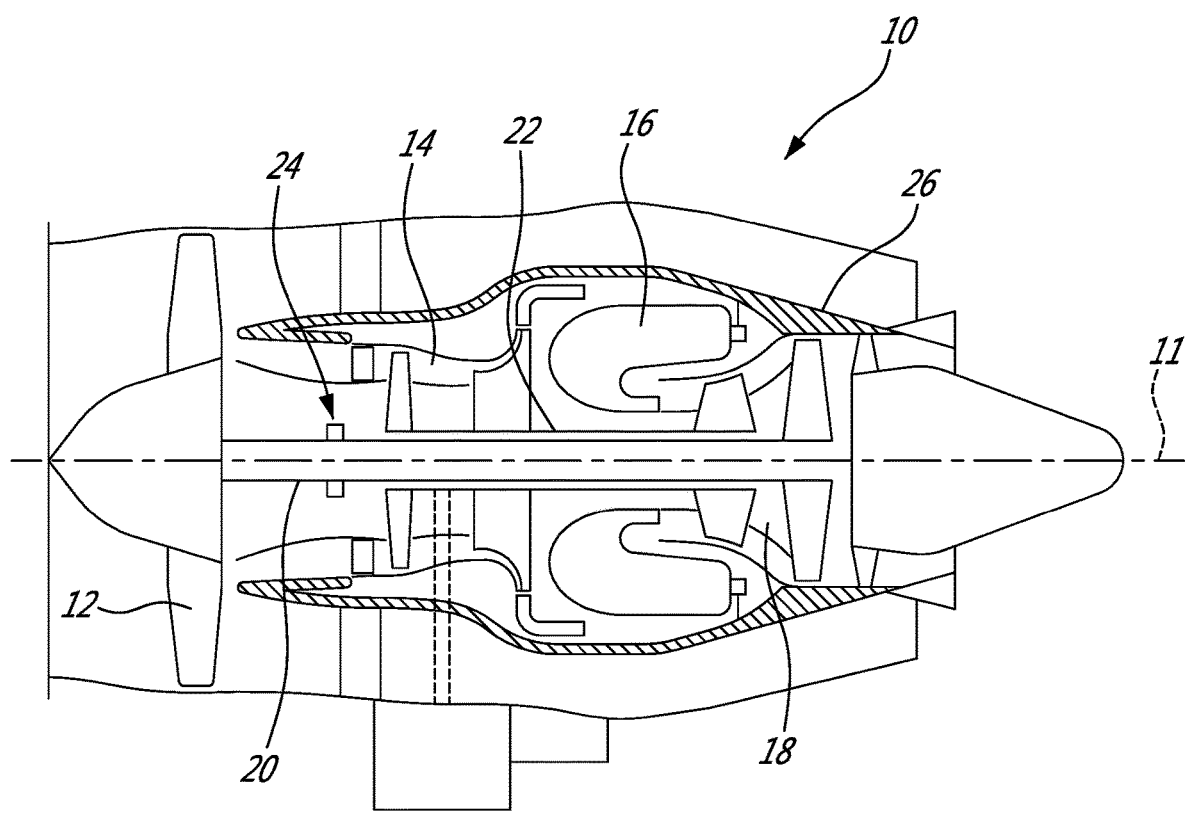
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. In the embodiment shown, the engine 10 has a low-pressure shaft 20 and a high-pressure shaft 22 both rotatable about a central axis 11 of the engine 10. The engine 10 has a housing, also referred to as casing, 26 for structurally supporting the shafts 20, 22.

Referring to FIGS. 1-2, one or more bearings 24 may be used to rotatably support the shafts 20, 22 and may be located between said shafts 20, 22 and the housing 26 of the engine 10. In other words, the bearings 24 are located between the housing 26, which is non-rotatable relative to the central axis 11, and the shafts 20, 22, which rotate about the central axis 11. In some cases, the bearings 24 are contained within a bearing cavity C (FIG. 2) that may be in fluid flow communication with a lubrication system S of the engine 10 for supplying oil to the bearing cavity C for lubricating the bearings 24. The bearing cavity C may be pressurized, that is, compressed air, which may be provided from the compressor section 14, may be injected via suitable conduit(s) into an environment E outside the bearing cavity C such that a pressure in the environment E is greater than that inside the bearing cavity C. Such a pressure differential may contribute in keeping the lubricant injected into the bearing cavity C from leaking out of the bearing cavity C. To seal the bearing cavity C from the environment E, a labyrinth seal may be used. Other arrangements with or without pressure differentials may be present. A possible embodiment of which is shown generally at 30 and described in detail herein below.

Referring now more particularly to FIG. 2, the labyrinth seal, referred to herein below as simply "the seal", 30 includes a rotating component, also referred to as a seal runner, or simply runner, 32, and a static component 34. The rotating component 32 may be a surface of one of the shafts 20, 22 or, as in the present case, is a component secured to the shaft. The static component 34 may be defined by the housing 26 of the engine 10. More specifically, the static component 34 may be a protrusion 26a of the housing 26. Alternatively, the static component 34 may be a component secured to the housing 26 of the engine 10. The static component 34 defines a seal land 34a and the seal runner 32 defines teeth 32a, also referred to as knife edges. Even though the expression tooth or teeth is used, it bears mentioning that the teeth 32A may be annular and surround the shafts 20,22. It will be appreciated that the teeth 32a may be defined by the static component 34 instead of by the runner 32 and that the seal land 34a may be defined by the runner 32 instead of by the static component 34. A sealing engagement is provided by a cooperation of the seal land 34a of the static component and the teeth 32a of the runner 32. The teeth 32a are spaced from the seal land 34a by gaps, also referred to as seal clearances G (FIG. 3). The seal 30 may be designed such that the seal clearances G remain in all operating conditions of the engine 10 (FIG. 1) to avoid the teeth 32a from rubbing against the seal land 34a. It will be appreciated that temperature gradients, centrifugal force, and other phenomena may cause the seal clearances G to fluctuate depending of the operating conditions of the engine 10. However, care should be taken to ensure minimum rubbing between the teeth 32a and the seal land 34a.

In the embodiment shown, the runner 32 is secured to a rotor R, which is in turn secured to one of the shafts 20, 22 of the engine 10 via a spline coupling 36, in one possible connection arrangement of the runner 32. The runner 32 may alternatively be directly secured to the one of the shafts 20, 22. The runner 32 may be in a tight fit engagement with the rotor R (or shaft) at an engagement location L of the runner 32. The engagement location L of the runner 32 may be a portion of a radially inner face 32b of the runner 32. Such a tight fit engagement may be created by having a diameter of the seal runner 32 at the engagement location L being less than that of the rotor R (or shaft 20, 22) at a location where the runner 32 is to be secured on the rotor R (or shaft 20, 22) before the runner 32 is secured to the rotor R (or shaft 20, 22).

As shown in FIG. 2, a flow of compressed air F may be injected in the environment E outside the bearing cavity C and may flow through one or more apertures 32f defined through the seal runner 32. The apertures 32f may be axially aligned with one or more apertures 32g defined through the static component 34. These apertures 32f, 32g may be in register in at least one circumferential position of the static component 34 relative to the seal runner 32. Herein, the environment E corresponds to a zone located axially between the housing 26 and a component 38 secured to the housing 26. The component 38 may be made of sheet metal. Other configurations are contemplated without departing from the scope of the present disclosure. The compressed air injected in the environment E may be at a higher temperature than the oil injected into the bearing cavity C by the lubrication system S. Consequently, the seal 30 may be subjected to a temperature gradient. Moreover, in some cases, the tight fit engagement between the runner 32 may affect the seal clearance G locally. That is, the teeth 32a located near the engagement location L may have a radial deflection relative to the central axis 11, which may be caused by the tight fit engagement, greater than radial deflections at the rest of the teeth 32a located further away from the engagement location L. This may cause the seal clearance G to be non-uniform along the runner 32. More specifically, the seal clearance G may be less at the teeth 32a located near the tight fit L than that at the rest of the teeth 32a. This may not be optimal for the seal performance since seal clearance G may have to be larger to avoid seal rubbing at the teeth 32a located near the tight fit L.

Referring to FIGS. 2-3, in the embodiment shown, the seal runner 32 is designed such that a clearance G1 defined between the seal land 34a and at least a first one of the teeth 32a is greater than a clearance G2 defined by at least a second one of the teeth 32a, the first one of the teeth 32a being the farthest from the bearing cavity C. At least the first one of the teeth 32a is closer to the engagement location L than the at least second one of the teeth 32a. Herein, "closer" may be in reference to a distance, which may be an axial distance relative to the central axis 11. That is, a distance between the at least first one of the teeth 32a and the engagement location L is less than a distance between the at least second one of the teeth 32a and the engagement location L. The at least first one of the teeth 32a may be aligned with the engagement location L. In other words, the engagement location L may axially overlap the at least first one of the teeth 32a. It will be appreciated that the expressions "first" and "second" do not necessarily imply immediate adjacency. That is, the at least first one of the teeth 32a is not necessarily immediately adjacent the at least second one of the teeth 32a and a third one of the teeth 32a may be disposed therebetween.

In the embodiment shown, the at least first one of the teeth 32a includes teeth of a first group 32a1 of the teeth 32a and the at least second one of the teeth 32a includes teeth 32a of a second group 32a2 of the teeth 32a. The teeth 32a of the first group 32a1 have a gap, or clearance, G1 being greater than the clearance G2 of the teeth 32a of the second group 32a2 of the teeth 32a.

This difference in the clearances G1, G2 may be created by having the teeth 32a of the first group 32a1 of the teeth 32a defining a first length L1 and by having the teeth 32a of the second group 32a2 of the teeth 32a defining a second length L2; the first length L1 less than the second length L2. The length of the teeth 32a may be defined as a distance, which may be a radial distance relative to the central axis 11, between a face 32e of the runner 32 from which the teeth 32a protrudes and tips 32c of the teeth 32a. A ratio of the first length L1 to the second length L2 may be selected such that the seal clearance is substantial constant along the seal length when in operating conditions.

The teeth may be angled relative to the face 32e of the seal runner 32. In such a case, the length of a tooth may be considered as a radial distance between the surface 32e of the seal runner 32 from which the tooth protrudes and a tip 32c of said tooth in a radial direction relative to the central axis 11. Stated differently, the length of a tooth may be the length of a projection of the tooth on a plane to which the central axis 11 is normal.

Alternatively, or in combination, all of the teeth 32a may have the same length and the difference in the clearances G1, G2 may be created by having the surface 32e of the runner 32 from which the teeth 32a protrudes defining two sections 32b1, 32b2 being radially offset from one another relative to the central axis 11, such as by having stepped diameters, etc. Each of the two sections 32b1, 32b2 may be located adjacent a respective one of opposite sides of the apertures 32f defined through the seal runner 32. A first one 32b1 of the two sections 32b1, 32b2 of the runner face 32b may be closer to the engagement location L than the second one 32b2 of the two sections 32b1, 32b2; the first one 32b1 of the two sections 32b1, 32b2 being located radially inwardly of the second one of the two sections 32b1, 32b2 relative to the central axis 11. In other words, a distance between the first section 32b1 of the seal runner 32b and the seal land 34a may be greater than a distance between the second section 32b2 of the seal runner 32b and the seal land 34a.

Any suitable manner of creating a difference in the clearances G1, G2 is contemplated. For instance, a radial distance D between the face 32e of the seal runner 32 and the seal land 34a may decrease from the engagement location L and away therefrom. Any combinations of variations of the lengths of the teeth 32a, variation of distance D between the seal land 34a and the runner face 32b, and seal land 34a sloping toward the seal runner 32 and toward the engagement location L may be used, either alone or in combination.

Figure 4:
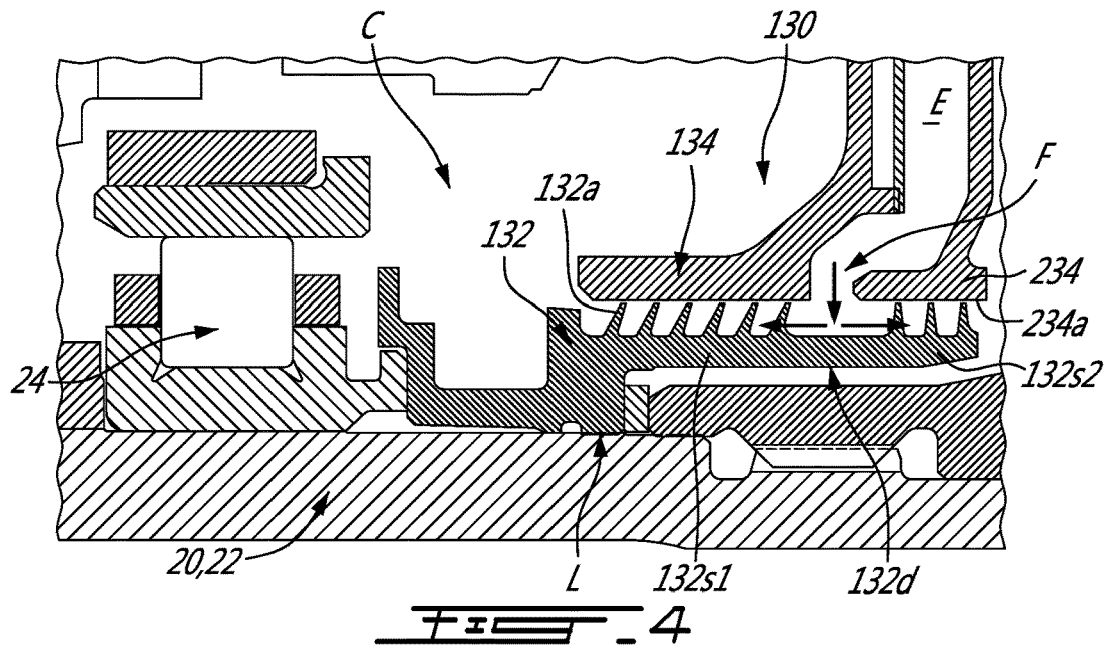
FIG. 4 is a schematic cross-sectional view of a portion of the gas turbine engine of FIG. 1 illustrating a labyrinth seal in accordance with one embodiment.

Referring now to FIG. 4, another embodiment of a seal is shown generally at 130. The seal 130 includes a seal runner 132 and a seal stator 134 in a sealing engagement with the seal runner 132. In the embodiment shown, a portion 132d of the seal runner 132 is cantilevered from the engagement location L between the seal runner 132 and the one of the shafts 20, 22. More specifically, the seal runner 132 has a radially inner face 132b which is in contact with the shaft 20, 22 at the engagement location L, and which is spaced apart from the shaft 20, 22 at the cantilevered portion 132d. Similarly to the seal 30 described above with reference to FIG. 3, the seal runner 132 is in a tight fit engagement with the shaft 20, 22 at the engagement location L. The seal runner 132 spans the seal stator 134 and a secondary seal stator 234 defining a secondary seal land 234a.

In the depicted embodiment, the seal runner 132 has a first section 132s1 and a second section 132s2 each being in a sealing engagement with a respective one of the seal stator 134 and secondary seal stator 234. The flow of compressed air F is injected into the environment E outside the bearing cavity C; the environment E being located between the two seal stators 134, 234.

As previously mentioned, the seal stator 134 is exposed to oil injected into the bearing cavity C on one side and exposed to the compressed air F, which is at a higher temperature than the oil, on an opposite side. This may create a temperature gradient which, in combination with the tight fit engagement at the engagement location L, may create variations into the clearances between the teeth 132a of the first section 132s1 of the seal runner 132 and the seal land 134a.

Figure 5:
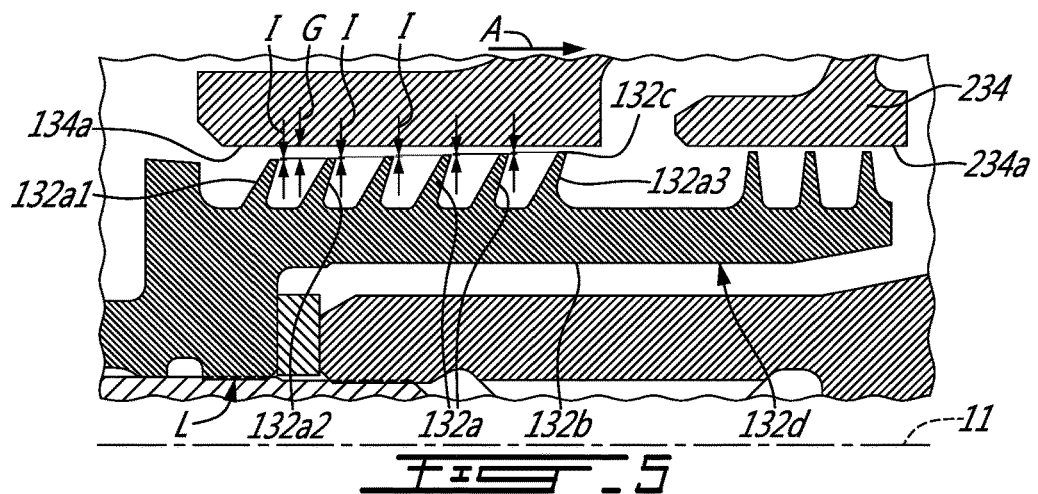
FIG. 5 is an enlarged view of the labyrinth seal of FIG. 4.

Referring now to FIG. 5, which illustrates an enlarged view of the seal 130 shown in FIG. 4, the teeth 132a of the seal runner 132 define clearances G between tips 132c of the teeth 132a and the seal land 134a. The clearance G of a first one 132a1 of the teeth 132a is greater than the clearance G of a second one 132a2 of the teeth 132a; the first one 132a1 of the teeth 132a being closer to the engagement location L than the second one 132a2 of the teeth 132a. Herein, "closer" may be in reference to a distance, which may be an axial distance relative to the central axis 11. That is, a distance between the at least first one 132a1 of the teeth 132a and the engagement location L is less than a distance between the at least second one 132a2 of the teeth 132a and the engagement location L.

The at least first one 132a1 of the teeth 132a may be aligned with the engagement location L. In other words, the engagement location L may axially overlap the at least first one of the teeth 132a. In the present case, all of the teeth 132a of the first section 132a1 of the seal runner 132 are located at the cantilevered portion 132d of the seal runner 132 but for the first one 132a1 of the teeth 132a; the first one 132a1 of the teeth 132a being the closest one from the engagement location L. Alternatively, more than one of the teeth 132a may be axially overlapping the engagement location L. Alternatively, all of the teeth 132a may be located at the cantilevered portion 132d of the seal runner 132.

In the embodiment shown herein, lengths of the teeth 132a increase gradually from the first one 132a1 of the teeth 132a to a last one 132a3 of the teeth 132a. In other words, the lengths of the teeth 132a increase in a direction denoted by arrow A in FIG. 5 and extending from the first one 132a1 of the teeth 132a and away therefrom and away from the engagement location L. Herein, the last one 132a3 of the teeth 132a is a sixth one of the teeth 132a, but more or less teeth 132a may be used without departing from the scope of the present disclosure. A length increase I, that is a difference between the lengths of two adjacent ones of the teeth 132a, may be constant for all teeth 132a of the first section 132a1 of the seal runner 132a. In the embodiment shown, the clearances G decrease continuously in the direction A extending away from the engagement location L from the first one 132a1 of the teeth 132a. The amount of clearance increase at the tight fit location may compensate the clearance variation due to tight it and due to thermal gradient so that clearance may become substantially uniform along the seal length in operation. The amount of clearance increase at the tight fit location may be derived from thermal and stress analysis that may be application specific. The clearance increase I near the engagement location L may be selected to make the clearances G substantially uniform when the engine 10 is in operation.

Figure 6:
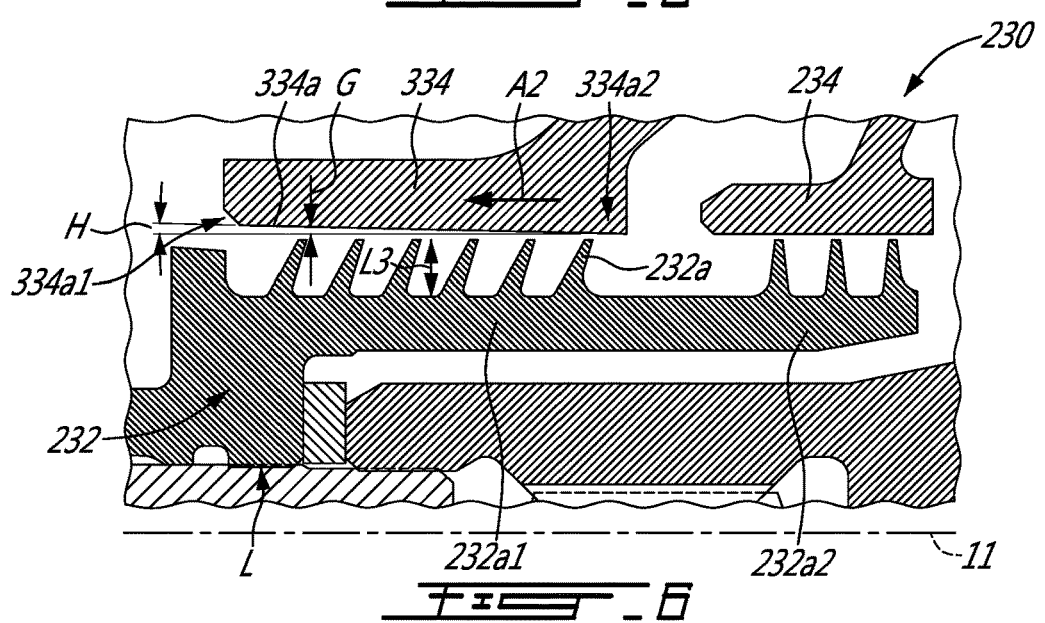
FIG. 6 is an enlarged view of a labyrinth seal in accordance with one embodiment.

Referring now to FIG. 6, an alternate embodiment of a seal is shown generally at 230. The seal 230 has a seal runner 232 and a seal stator 334 defining a seal land 334a. Similarly to the seal runner 132 of FIG. 5, the seal runner 232 has two sections 232a1, 232a2. In the present embodiment, all of the teeth 232a of the first section 232a1 of the seal runner 232 have substantially the same length L3. The variation in the clearances G is created by the seal land 334a of the seal stator 334 being angled relative to the central axis 11. The angle H between the seal land 334a and the central axis 11 may be selected in function of the results of thermal and stress analysis. Herein, the seal land 334a slopes away from the seal runner 232 in a direction denoted by arrow A2 and extending toward the engagement location L. In other words, the seal land 334a may be conically shaped instead of cylindrically shaped. The seal land 334a may have a cavity-end 334a1 and an opposed environment-end 334a2; a radial distance between the seal land 334a at the cavity-end 334a1 and the central axis 11 being greater than that between the seal land 334a at the environment-end 334a2 and the central axis 11. The cavity-end 334a1 may be closer to the bearing cavity C than the environment-end 334a2. In the embodiment shown, the tips of the teeth 232a are all spaced apart from the central axis 11 by the same distance. Other configurations are contemplated without departing from the scope of the present disclosure.

It is understood that any means used to create a labyrinth seal having a clearance between tips of the teeth and the seal land being greater proximate a location of a tight fit engagement between the seal runner and a rotating component are contemplated. For instance, any combinations of: shorter teeth near the tight fit, seal land sloping away from the seal runner; seal runner sloping towards the seal land; varying the angles between the teeth and the face of the seal runner; and so on are contemplated without departing from the scope of the present disclosure.

It is proposed herein to introduce a step on the seal runner outer diameter to make the knife edges near the tight fit with smaller outer diameter then the rest of the knife edges. This may compensate the local tight fit effect. Other contributors causing non-uniform seal clearance (e.g. non-matching temperature gradient in the static and the rotating parts of the seal, seal runner deflection due centrifugal force effect) may be compensated by introducing stepped knife edges outer diameters as discussed herein. Alternatively, optimizing the seal radial deflection so that it is substantially uniform along the seal length is contemplated. This may be achieved by optimizing the seal runner and the seal land shape so that all contributors (such as tight fit, thermal expansion, centrifugal growth), which may cause non-uniform seal clearance (along the seal length), may compensate each other. However, in some cases when radial and/or axial space is limited, this could not be achieved.

It is understood that the static component may define the teeth and may be secured to the housing via a tight fit engagement at a given location on the static component. A distance between the tip of a first one of the teeth and the central axis may be greater than that between the tip of a second one of the teeth and the central axis; the first one of the teeth located closer to the location than the second one of the teeth.

Embodiments disclosed herein include:

A. A labyrinth seal, comprising: rotating and static components rotatable relative to one another relative to a central axis, the rotating component securable to a shaft via a tight fit engagement at an engagement location on the rotating component, the static component securable to a housing; teeth protruding from one of the rotating and static components towards a seal land defined by the other one of the rotating and static components; and clearances between the teeth and the seal land, a first clearance of the clearances greater than a second clearance of the clearances, the first clearance located closer to the engagement location of the rotating component than the second clearance.

B. A gas turbine engine, comprising: a shaft rotatable about a central axis; a housing; and at least one bearing located radially between the shaft and the housing, the at least one bearing contained within a bearing cavity; and a labyrinth seal for sealing the bearing cavity from an environment outside of the bearing cavity, the labyrinth seal including a seal runner secured to the shaft via a tight fit engagement between the shaft and an engagement location of the seal runner, and a seal stator defined by the housing, teeth extending from one of the seal runner and the seal stator toward a seal land defined by the other of the seal runner and the seal stator, the teeth spaced apart from the seal land by clearances, a first clearance of the clearances being greater than a second clearance of the clearances, the first clearance closer to the bearing cavity than the second clearance.

C. A seal component for a labyrinth seal, the seal component configured to be secured to a shaft or a housing of a gas turbine engine and having a central axis, the seal component comprising a first face and an opposed second face, teeth protruding from the second face and away from the first face, a portion of the first face having a diameter different than that of the shaft or the housing such that the seal component is securable to the shaft or the housing via a tight fit engagement at the portion, a distance between a tip of one of the teeth and the central axis different than a distance between a tip of another one of the teeth and the central axis, the one of the teeth closer to the portion of the first face than the other one of the teeth.

Embodiments A, B, and C may include any of the following elements, in any combinations:

Element 1: a portion of the rotating component is cantilevered from the engagement location. Element 2: the first clearance is aligned with the engagement location. Element 3: the clearances between the teeth and the seal land decrease continuously from the first clearance in a direction away from the engagement location and parallel to the central axis. Element 4: the first clearance is defined between a first tooth of the teeth and the seal land and wherein the second clearance is defined between a second tooth the teeth and the seal land, a length of the first tooth less than that of the second tooth. Element 5: the teeth protrude from a face of the one of the rotating and static components, a distance between the seal land and the face decreasing from the engagement location and away therefrom. Element 6: the first clearance is defined between a first tooth of the teeth and the seal land and wherein the second clearance is defined between a second tooth of the teeth and the seal land, a length of the first tooth equal to that of the second tooth. Element 7: the teeth include a first group of the teeth defining the at least first one of the clearances and a second group of the teeth defining the second one of the clearances, the clearances of the first group of the teeth greater than the clearances of the second group of the teeth. Element 8: the seal land slopes toward the one of the rotating and static components. Element 9: each of the teeth have a same length. Element 10: the seal land slopes toward the one of the rotating and static components. Element 11: the first clearance is closer to the engagement location than the second clearance. Element 12: a portion of the seal runner is cantilevered from the engagement location. Element 13: the clearances between the teeth and the seal land decrease continuously from the first clearance in a direction away from the bearing cavity and parallel to the central axis. Element 14: the first clearance is defined between a first tooth of the teeth and the seal land and wherein the second clearance is defined between a second tooth of the teeth the seal land, a length of the first tooth less than that of the second tooth. Element 15: the teeth protrude from a face of the one of the rotating and static components, a distance between the seal land and the face decreasing from the engagement location and away therefrom. Element 16: the first clearance is defined between a first tooth of the teeth and the seal land and wherein the second clearance is defined between a second tooth of the teeth, a length of the first tooth equal to that of the second tooth. Element 17: a length of the one of the teeth is different than the length of the other one of the teeth.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A labyrinth seal assembly, comprising: rotating and static components rotatable relative to one another relative to a central axis, the rotating component securable to a shaft via a tight fit engagement at an engagement location on a first section of the rotating component, the tight fit engagement created by an inner face of the rotating component being in abutment against an outer face of the shaft at the engagement location, a radial contact defined between the inner face and the outer face, the static component securable to a housing, a spacing extending radially relative to the central axis between a second section of the rotating component and the shaft, the second section axially offset from the first section; teeth protruding from one of the rotating and static components towards a seal land defined by the other one of the rotating and static components; and clearances between the teeth and the seal land, a first clearance of the clearances axially aligned with or proximate the first section of the rotating component greater than a second clearance of the clearances axially aligned with the second section of the rotating component, the first clearance located axially closer to the engagement location of the rotating component than the second clearance.

2. The labyrinth seal assembly of claim 1, wherein the second section of the rotating component is cantilevered from the engagement location.

3. The labyrinth seal assembly of claim 1, wherein the first clearance is aligned with the engagement location.

4. The labyrinth seal assembly of claim 1, wherein the clearances between the teeth and the seal land decrease continuously from the first clearance in a direction away from the engagement location and parallel to the central axis.

5. The labyrinth seal assembly of claim 1, wherein the first clearance is defined between a first tooth of the teeth and the seal land and wherein the second clearance is defined between a second tooth the teeth and the seal land, a length of the first tooth less than that of the second tooth.

6. The labyrinth seal assembly of claim 1, wherein the teeth protrude from a face of the one of the rotating and static components, a distance between the seal land and the face decreasing from the engagement location and away therefrom.

7. The labyrinth seal assembly of claim 6, wherein the first clearance is defined between a first tooth of the teeth and the seal land and wherein the second clearance is defined between a second tooth of the teeth and the seal land, a length of the first tooth equal to that of the second tooth.

8. The labyrinth seal assembly of claim 1, wherein the teeth include a first group of the teeth defining the at least first one of the clearances and a second group of the teeth defining the second one of the clearances, the clearances of the first group of the teeth greater than the clearances of the second group of the teeth.

9. The labyrinth seal assembly of claim 1, wherein the seal land slopes toward the one of the rotating and static components.

10. The labyrinth seal assembly of claim 9, where each of the teeth have a same length.

11. A gas turbine engine, comprising: a shaft rotatable about a central axis; a housing; and at least one bearing located radially between the shaft and the housing, the at least one bearing contained within a bearing cavity; and a labyrinth seal for sealing the bearing cavity from an environment outside of the bearing cavity, the labyrinth seal including a seal runner secured to the shaft via a tight fit engagement between the shaft and an engagement location on a first section of the seal runner, a second section of the seal runner being cantilevered from the engagement location and free of contact with the shaft, and a seal stator defined by the housing, teeth extending from one of the seal runner and the seal stator toward a seal land defined by the other of the seal runner and the seal stator, the teeth spaced apart from the seal land by clearances, a first clearance of the clearances axially aligned with or proximate the first section of the seal runner being greater than a second clearance of the clearances axially aligned with the second section of the seal runner, the first clearance axially closer to the bearing cavity and to the engagement location than the second clearance.

12. The gas turbine engine of claim 11, wherein the seal land slopes toward the one of the rotating and static components.

13. The gas turbine engine of claim 11, wherein the first clearance is closer to the engagement location than the second clearance.

14. The gas turbine engine of claim 11, wherein the clearances between the teeth and the seal land decrease continuously from the first clearance in a direction away from the bearing cavity and parallel to the central axis.

15. The gas turbine engine of claim 11, wherein the first clearance is defined between a first tooth of the teeth and the seal land and wherein the second clearance is defined between a second tooth of the teeth the seal land, a length of the first tooth less than that of the second tooth.

16. The gas turbine engine of claim 11, wherein the teeth protrude from a face of the one of the rotating and static components, a distance between the seal land and the face decreasing from the engagement location and away therefrom.

17. The gas turbine engine of claim 16, wherein the first clearance is defined between a first tooth of the teeth and the seal land and wherein the second clearance is defined between a second tooth of the teeth, a length of the first tooth equal to that of the second tooth.

18. A labyrinth seal assembly comprising: first and second components rotatable relative to one another relative to a central axis, the first component securable to one of a shaft and a housing of a gas turbine engine, the first component having a first face and an opposed second face, teeth protruding from the second face and away from the first face, a first section the first face having a diameter different than that of the one of the shaft and the housing such that the seal component is securable to the one of the shaft and the housing via a tight fit engagement at the first section, the tight fit engagement consisting of a radial contact between the first face of the first component and the one of the shaft and the housing, the first face having a second section axially offset from the first section, the second section being free of contact with the one of the shaft and the housing, a distance between a tip of a first one of the teeth and the central axis different than a distance between a tip of a second one of the teeth and the central axis, the first one of the teeth axially aligned with or proximate the first section of the first face, ,the second one of the teeth axially aligned with the second section, the first one of the teeth axially closer to the tight fit engagement than the second one of the teeth.

19. The labyrinth seal assembly of claim 18, wherein a length of the one of the teeth is different than the length of the other one of the teeth.

* * * * *